United States Patent
Gbur

(10) Patent No.: US 10,822,520 B1
(45) Date of Patent: Nov. 3, 2020

(54) RADIATION POLYMERIZABLE WATERBORNE SOFT-FEEL COATINGS

(71) Applicant: THE SHERWIN-WILLIAMS COMPANY, Cleveland, OH (US)

(72) Inventor: Garry A. Gbur, Homewood, IL (US)

(73) Assignee: The Sherwin-Williams Company, Cleveland, OH (US)

( * ) Notice: Subject to any disclaimer, the term of this patent is extended or adjusted under 35 U.S.C. 154(b) by 0 days.

(21) Appl. No.: 14/731,671

(22) Filed: Jun. 5, 2015

Related U.S. Application Data

(60) Provisional application No. 62/008,136, filed on Jun. 5, 2014.

(51) Int. Cl.
  *C09D 175/14*   (2006.01)
(52) U.S. Cl.
  CPC .................. *C09D 175/14* (2013.01)
(58) Field of Classification Search
  None
  See application file for complete search history.

(56) References Cited

U.S. PATENT DOCUMENTS

| 6,414,079 | B1 | 7/2002 | Schafheutle et al. |
| 6,521,702 | B1 | 2/2003 | Weikard et al. |
| 2004/0242765 | A1 * | 12/2004 | Munzmay .......... C08G 18/0823 524/589 |
| 2014/0303303 | A1 * | 10/2014 | Benson ................ C09D 5/4465 524/407 |
| 2015/0353768 | A1 * | 12/2015 | Yamada ................. C08G 18/65 524/591 |

FOREIGN PATENT DOCUMENTS

| CN | 1572810 | 2/2005 | |
| CN | 1572849 | 2/2005 | |
| CN | 101622291 | 1/2010 | |
| EP | 1489120 A1 * | 12/2004 | .......... C08G 18/0823 |

* cited by examiner

*Primary Examiner* — Robert S Walters, Jr.
(74) *Attorney, Agent, or Firm* — Honigman LLP

(57) ABSTRACT

A soft-feel radiation polymerizable aqueous coating composition comprising:
  (i) an aqueous polyurethane dispersion having radiation polymerizable ethylenic unsaturation and which is substantially free of groups reactive with hydroxyl functionality under conditions of radiation polymerization; and
  (ii) an aqueous polyurethane polyol which is substantially free of polymerizable ethylenic unsaturation and which is unreactive with the aqueous polyurethane dispersion (i) under conditions of radiation polymerization;
  (iii) a photoinitiator; and
  (iv) water;
and wherein the coating composition is free of external crosslinkers reactive with the polyurethane polyol.

2 Claims, No Drawings

RADIATION POLYMERIZABLE WATERBORNE SOFT-FEEL COATINGS

This application claims priority from Provisional Application No. 62/008,136 filed on Jun. 5, 2014, the entirety of which is hereby incorporated by reference.

FIELD OF THE INVENTION

This invention relates to a 1K radiation polymerizable waterborne soft-feel coatings having excellent adhesion, solvent and mar resistance, wherein the soft-feel coatings comprise a combination of an aqueous polyurethane dispersion and an aqueous polyurethane polyol.

BACKGROUND OF THE INVENTION

The use of plastic has become ubiquitous in the manufacture of household products, toys, tools, entertainment devices, computer hardware, and automobile components. Plastic substrates are generally low cost, durable and light weight; however, plastic is susceptible to being damaged by sunlight and weathering, impacts, and exposure to chemicals, including common chemicals found in lotions and insect repellants. In recent decades, coatings have been developed for application to plastic substrates that are intended to protect the substrate and provide aesthetic value. More recently, coatings have been surfacing that not only protect the plastic surface but also impart a soft, grippy or rubbery feel to the otherwise hard plastic. These coatings have been generally branded with the term "soft-touch" or "soft feel" coatings.

Soft-feeling paints and coatings provide desirable aesthetic and tactile characteristics for a variety of applications, particularly articles that are touched by consumers. Consumer electronic products such as cell phones, calculators, computers, tablets, readers, key boards, sports equipment, automotive armrests, dashboards etc. are all representative items which can desirably be coated with soft-feeling coatings.

The term "soft-feel" as used herein refers to a particular tactual sensation (tactility) or haptic property on the part of the cured, painted surface. Since the haptic soft-feel properties are typically measured by human touch, they are somewhat subjective and are typically described using terms such as cold, dry, velvety, silky, warm or rubbery, demonstrating a range from "low" haptic properties, such as an automotive exterior coating which might be considered as having a "hard" and "cold" tactile sensation while softer feeling films would have a "silky", "velvety" or rubbery" tactile sensation. As used herein, the term "soft-feel" means coatings which upon cure have a velvety, silky, warm or rubbery feel as opposed to conventional (non-soft-feel) coatings which will typically feel cold and hard to the touch.

Soft-feel coatings have been subject to increasingly demanding specifications as well. Particularly, soft-feel coatings are being challenged to have improved adhesion, solvent resistance and hardness for protection of plastic and other substrates. Adhesion loss of the coating to the plastic substrate can, in some instances, cause damage to the underlying plastic substrate. One approach to resolving this has been a multi-coating system incorporating a primer for chemical resistance and a soft-feel top coat. However, this multi-coating approach is time consuming and costly.

First-generation soft-feel coatings were largely solventborne polyurethanes based on blends of polyols and isocyanates. Environmental regulations and consumer preferences have caused coatings suppliers to develop more environmentally friendly technologies. Therefore, new generations of soft-feel coatings have shifted toward 2K waterborne chemistries, primarily, but not exclusively, utilizing polyurethane dispersions (PUDs). More recently, 1K soft-feel coatings have been under research.

Aqueous 1K soft-feel coatings utilizing hydroxy functional PUD's with crosslinkers such as polyisocyanates are known, but often have poor adhesion to plastics and poor alcohol resistance, especially if a very low Tg polymer is used to enhance the soft-feel nature of the product. Additionally, since isocyanates react with water it is often necessary to utilize an excess of isocyanate. The isocyanate groups continue to react and this "aftercuring" can adversely affect the soft-feel. Melamines and ureas are also known as crosslinkers but they often require elevated curing temperatures that are not acceptable on some plastics. Further, in 1K systems, the high temperatures required for crosslinking adversely affect the soft surface of the soft-feel coating. Further still, when coating plastics, the crosslinking temperature is limited by the softening temperature of the polymer substrate There was therefore a need to develop a 1K soft-feel coating that durably retains the soft feel and which can be cured without requiring high heat for polymerization. The object has been achieved by a reactive combination of polyurethane dispersions under high energy radiation polymerization.

The soft-feel coatings of this invention is directed to a 1K waterborne soft-feel coating having excellent adhesion, solvent and mar resistance. The soft-feel coatings of this invention can be applied to many substrates such as wood, plastic, metal, or paper and may be applied atop a primed or previously painted layer. In some embodiments, due to their excellent adhesion, the coatings of this invention are especially useful on plastic substrates such as high impact polystyrene, acrylonitirle butadiene styrene (ABS), polycarbonate, thermoplastic polyurethane, polyvinyl chloride, etc.

DETAILED DESCRIPTION OF THE INVENTION

This invention relates to single component water reducible radiation polymerizable coatings which cure to a film having excellent adhesion, solvent and mar resistance while maintaining a favorable tactile "soft-feel".

The coatings involve the combination of:
 (i) an aqueous polyurethane dispersion (PUD) having radiation polymerizable ethylenic unsaturation and which is substantially free of groups reactive with hydroxyl functionality under conditions of high energy radiation polymerization; and
 (ii) an aqueous dispersion of a polyurethane polyol (PUD) which is substantially free of polymerizable unsaturation, and which is unreactive with the aqueous polyurethane dispersion (i) under conditions of high energy radiation polymerization; and
 (iii) a photoinitiator.

The coatings can be conveniently cured by exposure to actinic radiation having a wavelength less than about 4000 Angstroms, such as ultraviolet and electron beam radiation.

As used herein, the term, "substantially free of", means that element, other than to the extent it may be incidentally present in any raw material, is not intentionally present or intentionally added.

As used herein, the term "conditions of high energy radiation polymerization" means typical reaction conditions within the industry for the high energy cure of polymers and at temperatures not exceeding those normally involved in flashing off solvents.

Additionally, radiation polymerizable PUD acrylates having good adhesion to plastics and good chemical resistance are known, but they often fail to have acceptable soft-feel properties.

The water reducible compositions of this invention provide stable coatings having excellent adhesion, favorable soft-feel properties and excellent hardness and solvent resistance and protection for plastic and other substrates.

In one embodiment, the radiation polymerizable aqueous coating compositions of this invention comprise:
(i) an aqueous polyurethane dispersion having radiation polymerizable ethylenic unsaturation and which is substantially free of groups reactive with hydroxyl functionality under conditions of radiation polymerization; and
(ii) an aqueous polyurethane polyol dispersion which is substantially free of polymerizable ethylenic unsaturation and which is unreactive with the aqueous polyurethane dispersion (i) under conditions of radiation polymerization;
(iii) a photoinitiator; and
(iv) water;
and wherein the coating composition is substantially free of external crosslinkers reactive with active hydrogen.

In another embodiment, the present invention is directed to a method for improving the adhesion, solvent and mar resistance of a soft-feel coating composition that comprises the combination of:
(i) an aqueous polyurethane dispersion (PUD) having radiation polymerizable ethylenic unsaturation and which is substantially free of groups reactive with hydroxyl functionality under conditions of high energy radiation polymerization; and
(ii) an aqueous dispersion of a polyurethane polyol (PUD) which is substantially free of polymerizable unsaturation, and which is unreactive with the aqueous polyurethane dispersion (i) under conditions of high energy radiation polymerization; and
(iii) a photoinitiator.

The coatings can be conveniently cured by exposure to actinic radiation having a wavelength less than about 4000 Angstroms, such as ultraviolet and electron beam radiation.

The weight solids ratio of the aqueous polyurethane dispersion having radiation polymerizable ethylenic unsaturation and the aqueous polyurethane polyol can be varied widely to obtain the desired "soft-feel". In some embodiments the aqueous polyurethane dispersion having radiation polymerizable ethylenic unsaturation will be present at a level of weight solids such that the weight percent solids of the unsaturated PUD will be at least about 16% of the total combined weight solids of the unsaturated PUD and the polyol PUD. For many applications, it will be present at a level up to about 50% and for many applications will be at a range of about 16 to about 35%.

The coatings of this invention provide sufficient hardness and chemical resistance based upon the high energy cure alone and the coatings will be free of external crosslinkers such as isocyanates, ureas, melamines etc. that would be reactive with hydroxyl groups or other active hydrogen groups.

1. Aqueous Polyurethane Dispersion Having Radiation Polymerizable Ethylenic Unsaturation Ethylenically unsaturated aqueous polyurethane dispersions are well known in the art and are widely commercially available. The polyurethanes typically contain pendent unsaturation groups and will have water-dispersibility assisting groups such as anionic, cationic, or hydrophilic groups to provide water dispersibility.

In one representative method of preparation, an aqueous polyurethane dispersion can be obtained by the reaction of one or more isocyanates and one or more active hydrogen containing compounds such as alcohols, amines, polyols or polyamides. The active hydrogen containing groups can also contain ionic groups—such as acid functionality, for example from hydroxy functional carboxylic acids such as dimethylolpropanoic acid, malic acid and the like. Non-ionic groups such as polyethylene oxide groups can also be incorporated to provide water miscibility.

Representative commercially available unsaturated polyurethane dispersions include Ucecoat® 7200 form Cytec, Bayhydrol® UV XP 2689/1 from Bayer Material Science, and Neorad® R-1500.

2. Polyurethane Polyol

Similarly, hydroxy functional water reducible polyurethane dispersions are well known in the art. In one embodiment of this invention, it is useful to utilize polyurethane polyols of relatively low hydroxyl value, generally less than about 25, and for some embodiments between 10 and 20. The polyurethane polyol will have a Tg of at least about 30° C. For many embodiments, the Tg of the polyol will be less than about 60° C. and sometimes less than 50° C. For some embodiments the Tg will be in a range between 35 and 45° C.

The hydroxy functional polyurethane dispersions can be prepared by any method known in the art. One representative method is by the reaction of one or more isocyanates and a stoichiometric excess of one or more polyols. Ionic groups—such as acid functionality, for example can be incorporated by the use of from hydroxy functional carboxylic acids such as dimethylolpropanoic acid, malic acid and the like. Non-ionic groups such as polyethylene oxide groups can also be incorporated to provide water miscibility.

3. Additional Materials

The coatings of this invention can also incorporate other materials known in the art. If desired, water miscible organic solvents, typically less than 20%, and often less than 10% by weight of the coating composition, can be added. Generally these solvents should be low boiling alcohols, ethers or similar materials that will evaporate quickly from the film once it is applied to minimize flash off time. Flow agents, light stabilizers, dispersants and pigments (if they do not adversely affect the high energy cure) can also be added.

Water miscible unsaturated monomers and oligomer could be added to the compositions of this invention, but for some embodiments, such as those where the monomers might chemically attack or haze the substrate, or when it is desired to minimize exposure to monomers they can be excluded. In a useful embodiment, the compositions are free of unsaturated monomers.

Typically, the coatings will also contain an effective catalytic amount, usually about 0.1 to about 8% by weight of the polymerizable compounds, of a free radical polymerization initiator, such as a photoinitiator, to facilitate cure of the coating after application. Typical photoinitiators include benzophenone. Michler's ketone, diethoxyacetophenone, 2-chlorothioxanthone, hydroxy-alkyl phenones, and other materials known in the art.

The compositions of this invention can be conveniently applied by any conventional method, such as spray, curtain coating, etc. to a substrate, allowed a short flash time (possibly at temperatures ranging up to about 60° C.) and then cured by exposure to high energy radiation. High energy radiation typically has a wavelength less than about 4,000 Angstroms such as electron beam or ultraviolet light radiation. The exposure need only be long enough to provide the desired amount of cure. The time required for cure depends on the intensity of the incident radiation, but typically sufficient cure can be obtained in one minute or less. Typical doses of ultraviolet radiation range from about 5 to about 150 feet/minute/lamp while useful doses of electron beam radiation range from about 0.5 to about 15 megarads.

It would also be possible to cure the coatings of the invention by any other free radical initiator, e.g. visible light initiators such as taught in U.S. Pat. No. 3,650,699 or 4,071,424 or by subjecting the coatings to heat in the presence of a heat sensitive free radical initiator. Although these methods may be useful, they are not preferred for most embodiments because the thermal initiators are undesirable for heat-sensitive substrates and are less energy efficient than curing by exposure to radiation, and the visible light initiators often require special handling to avoid premature polymerization.

As used herein, unless otherwise stated, the term "parts" means parts by weight and percentages are percent by weight.

Example 1

A model coating formula containing a hydroxy functional polyurethane dispersion was prepared by combining materials in the order shown below:

| Raw Material | Parts by Weight |
| --- | --- |
| hydroxy functional polyurethane dispersion[1] | 719.23 |
| defoamer[2] | 0.84 |
| water | 50.09 |
| sodium nitrate | 1.17 |
| dipropylene glycol methyl ether (DPM) | 16.72 |
| 2-butoxyethoxyethanol | 25.09 |
| defoamer | 1.67 |
| surfactant[3] | 0.84 |
| UV stabilizer[4] | 1.09 |
| dimethylethanolamine | 1.67 |
| associative thickness[5] | 7.19 |
| water | 16.73 |
| defoamer | 0.84 |

[1]Commercially supplied polyurethane dispersion having a Tg of 41° C., and an OH # of 18. Supplied at 38.4% NVM in a 93/7 mix of water/dipropylene glycol dimethyl ether
[2]Tego® Foamex® 805
[3]Byk® 346
[4]Tinuvin® 292
[5]Rheovis® PU 1214 from BASF Example 2

A Pre-Mix of 99 parts of a commercially available UV curable ethylenically unsaturated polyurethane dispersion, Bayhydrol UV XP 2689/1, (42% NVM in water) commercially available from Bayer Material Science) and 1 part Irgacure® 500 (1/1 blend of benzophenone and 1-hydroxy-cyclohexyl-phenyl-ketone commercially available from BASF) was prepared. This premix was then blended at various levels with the coating of Example 1 to produce the Examples below. The individual formulas were spray applied at about a 0.6 mil dry film thickness to ABS plastic and to Q-Steel panels, allowed to flash for 20 minutes at 140° F. (60° C.), and cured by exposure to a mercury vapor UV lamp. All gave acceptable adhesion to the ABS plastic. Solvent resistance was measured by 50 rubs with isopropyl alcohol. Hardness was measured as pencil hardness on the Q-Steel panels. The Solid ratio is the weight percent solids of the ethylenically unsaturated PUD divided by the total weight solids of the hydroxy functional PUD and the ethylenically unsaturated PUD combined.

| Example | Parts Example 1 | Parts Pre-Mix | Solvent Resistance | Hardness | Feel | Solid ratio |
| --- | --- | --- | --- | --- | --- | --- |
| 2 | 100 | 5 | severe burnish | HB | velvety | 5.7% |
| 3 | 100 | 10 | severe burnish | HB | velvety | 10.8% |
| 4 | 100 | 15 | severe burnish | H | velvety | 15.4% |
| 5 | 100 | 20 | moderate burnish | HB | velvety | 19.5% |
| 6 | 100 | 25 | moderate burnish | HB | silky | 23.3% |
| 7 | 100 | 30 | moderate burnish | H | silky | 26.7% |
| 8 | 100 | 35 | moderate burnish | HB | silky | 29.8% |

The modification levels above about 16% provide acceptable burnish resistance, adhesion and "soft-feel". By comparison, a 2-component formula using Example 1 crosslinked with a commercially available polyisocyanate still exhibited severe burnishing from isopropyl alcohol.

While this invention has been described by a specific number of embodiments, it is obvious that other variations and modifications may be made without departing from the spirit and scope of the invention as set forth in the appended claims.

What is claimed is:
1. A radiation polymerizable aqueous coating composition consisting essentially of:
(i) an aqueous polyurethane dispersion having radiation polymerizable ethylenic unsaturation and which is substantially free of groups reactive with hydroxyl functionality under conditions of radiation polymerization; and
(ii) an aqueous polyurethane polyol having a Tg between 35 and 45° C. and a hydroxyl value of 10 to 20, and which is substantially free of polymerizable ethylenic unsaturation and which is unreactive with the aqueous polyurethane dispersion (i) under conditions of radiation polymerization;
(iii) a photoinitiator; and
(iv) water;
wherein the radiation polymerization is high energy radiation having wavelength less than 4000 Angstroms;
wherein the weight solids ratio is 19 to 30 weight percent of the ethylenically unsaturated polyurethane dispersion relative to the total weight solids of the aqueous polyurethane polyol and the ethylenically unsaturated polyurethane dispersion; and
wherein the coating composition has no intentionally added crosslinkers reactive with the polyurethane polyol, and wherein curing the coating composition forms a soft-feel texture after polymerization by treatment with an effective amount of actinic radiation.

2. The composition of claim 1 wherein the composition is substantially free of ethylenically unsaturated monomers.

\* \* \* \* \*